United States Patent
Ikeda et al.

(10) Patent No.: US 10,068,335 B2
(45) Date of Patent: Sep. 4, 2018

(54) MOVING-OBJECT COUNTER APPARATUS, MOVING-OBJECT COUNTING METHOD, AND NON-TRANSITORY COMPUTER READABLE MEDIUM

(71) Applicant: FUJI XEROX CO., LTD., Tokyo (JP)

(72) Inventors: Daisuke Ikeda, Kanagawa (JP); Takeshi Onishi, Kanagawa (JP); Masatsugu Tonoike, Kanagawa (JP); Jun Shingu, Kanagawa (JP); Yusuke Uno, Kanagawa (JP); Yusuke Yamaura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 72 days.

(21) Appl. No.: 15/250,322

(22) Filed: Aug. 29, 2016

(65) Prior Publication Data
US 2017/0278254 A1    Sep. 28, 2017

(30) Foreign Application Priority Data

Mar. 25, 2016 (JP) ................................. 2016-061313

(51) Int. Cl.
*G06T 7/73* (2017.01)
*G06T 7/00* (2017.01)
*G06T 7/20* (2017.01)

(52) U.S. Cl.
CPC .......... *G06T 7/0042* (2013.01); *G06T 7/0081* (2013.01); *G06T 7/0097* (2013.01);
(Continued)

(58) Field of Classification Search
CPC ........... G06T 7/20; G06T 7/246; G06T 7/292; G06T 7/70; G06T 7/73; G06T 7/97;
(Continued)

(56) References Cited

U.S. PATENT DOCUMENTS

| 2014/0037147 | A1* | 2/2014 | Yoshio et al. | ..... G06K 9/00778 382/107 |
| 2014/0355829 | A1* | 12/2014 | Heu et al. | .......... G06K 9/00778 382/103 |

(Continued)

FOREIGN PATENT DOCUMENTS

JP    2009-230724 A    10/2009

*Primary Examiner* — Andrew W Johns
(74) *Attorney, Agent, or Firm* — Oliff PLC

(57) ABSTRACT

A moving-object counter apparatus includes a first captured-image acquisition unit, a moving-object moving-path specifying unit, a virtual-line setting unit, and a first moving-object counter unit. The first captured-image acquisition unit acquires multiple images captured at respective times different from each other by a first imaging apparatus capturing images of a predetermined region. The moving-object moving-path specifying unit specifies, on the basis of the acquired images, one or more moving paths along which one or more respective moving objects have moved in the predetermined region. The virtual-line setting unit sets a virtual line on the basis of the specified one or more moving paths. The first moving-object counter unit counts, by counting one or more moving paths that cross the set virtual line among the specified one or more moving paths, one or more moving objects that have passed through the predetermined position.

9 Claims, 12 Drawing Sheets

(52) U.S. Cl.
 CPC .. *G06T 7/2093* (2013.01); *G06T 2207/10016* (2013.01); *G06T 2207/30196* (2013.01); *G06T 2207/30201* (2013.01); *G06T 2207/30232* (2013.01); *G06T 2207/30242* (2013.01)

(58) Field of Classification Search
 CPC . G06T 2207/30196; G06T 2207/30201; G06T 2207/30232; G06T 2207/30242; G06K 9/00771; G07C 9/00126
 See application file for complete search history.

(56) References Cited

U.S. PATENT DOCUMENTS

| | | | |
|---|---|---|---|
| 2015/0294183 A1* | 10/2015 | Watanabe et al. | G06K 9/52 382/203 |
| 2017/0039728 A1* | 2/2017 | Bamba | G06T 7/2033 |
| 2017/0098299 A1* | 4/2017 | Liu | G06T 7/004 |
| 2017/0185828 A1* | 6/2017 | Yamamoto et al. | G06K 9/00335 |

* cited by examiner

| MOVING DIRECTION | COUNTED VALUE |
|---|---|
| 0° | 0 |
| 45° | 1 |
| 90° | 6 |
| 135° | 0 |
| 180° | 0 |
| 225° | 0 |
| 270° | 3 |
| 315° | 0 |

FIG. 11

| t | x | y | AREA |
|---|---|---|---|
| 10:00:00:00 | 200 | 0 | 250 |
| 10:00:00:50 | 200 | 50 | 200 |
| 10:00:01:00 | 200 | 100 | 150 |
| 10:00:01:50 | 200 | 150 | 100 |
| 10:00:02:00 | 200 | 200 | 150 |
| 10:00:02:50 | 200 | 250 | 200 |
| 10:00:03:00 | 200 | 300 | 250 |
| 10:00:03:50 | 200 | 350 | 300 |
| 10:00:04:00 | 200 | 400 | 350 |

| t | x | y | AREA |
|---|---|---|---|
| 10:00:00:00 | 200 | 0 | 15 |
| 10:00:00:50 | 200 | 50 | 10 |
| 10:00:01:00 | 200 | 100 | 5 |
| 10:00:01:50 | 200 | 150 | 0 |
| 10:00:02:00 | 200 | 200 | 5 |
| 10:00:02:50 | 200 | 250 | 10 |
| 10:00:03:00 | 200 | 300 | 15 |
| 10:00:03:50 | 200 | 350 | 20 |
| 10:00:04:00 | 200 | 400 | 25 |

MOVING-OBJECT COUNTER APPARATUS, MOVING-OBJECT COUNTING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-061313 filed Mar. 25, 2016.

BACKGROUND

Technical Field

The present invention relates to a moving-object counter apparatus, a moving-object counting method, and a non-transitory computer readable medium.

SUMMARY

According to an aspect of the invention, there is provided a moving-object counter apparatus including a first captured-image acquisition unit, a moving-object moving-path specifying unit, a virtual-line setting unit, and a first moving-object counter unit. The first captured-image acquisition unit acquires multiple images captured at respective times different from each other by a first imaging apparatus capturing images of a predetermined region. The moving-object moving-path specifying unit specifies, on the basis of the multiple images acquired by the first captured-image acquisition unit, one or more moving paths along which one or more respective moving objects have moved in the predetermined region. The virtual-line setting unit sets a virtual line on the basis of the one or more moving paths specified by the moving-object moving-path specifying unit, the virtual line being imagined on the images acquired by the first captured-image acquisition unit, and serving as a reference for counting of one or more moving objects that have passed through a predetermined position in the predetermined region. The first moving-object counter unit counts, by counting one or more moving paths that cross the set virtual line among the one or more moving paths specified by the moving-object moving-path specifying unit, the one or more moving objects that have passed through the predetermined position.

BRIEF DESCRIPTION OF THE DRAWINGS

An exemplary embodiment of the present invention will be described in detail based on the following figures, wherein:

FIG. 11 is a diagram illustrating an example of the areas of person regions corresponding to sets of coordinates constituting a moving path;

DETAILED DESCRIPTION

In the following, an exemplary embodiment of the present invention will be described with reference to the drawings.

1. Exemplary Embodiment 1-1. Configuration

Figure 1:
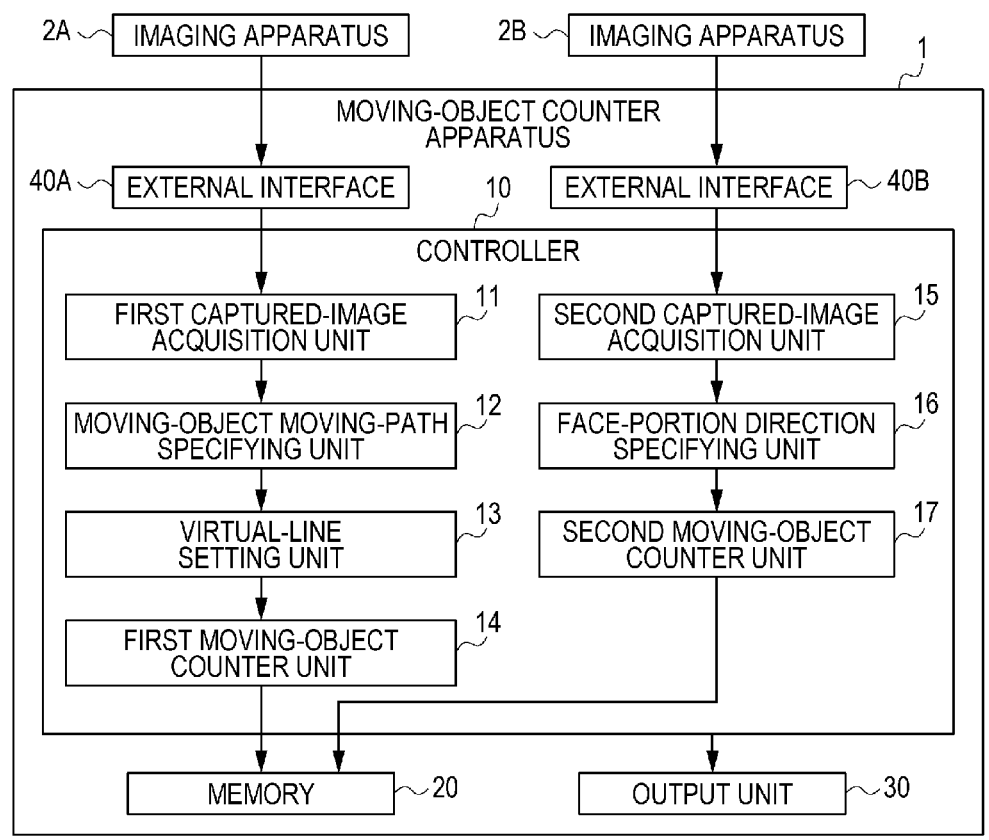
FIG. 1 is a diagram illustrating an example of the configuration of a moving-object counter apparatus.

FIG. 1 is a diagram illustrating an example of the configuration of a moving-object counter apparatus 1 according to an exemplary embodiment of the present invention. The moving-object counter apparatus 1 is an apparatus that counts, on the basis of images captured by an imaging apparatus 2A, objects that are moving (hereinafter referred to as "moving objects"). Here, specifically, the moving objects are persons. The moving-object counter apparatus 1 includes a controller 10, a memory 20, an output unit 30, and external interfaces 40A and 40B.

The controller 10 includes an arithmetic processing unit such as a central processing unit (CPU), and a memory, and executes a program stored in the memory 20. The memory 20 is a storage device such as a hard disk, and stores various types of data in addition to the program executed by the controller 10. The output unit 30 outputs the various types of data stored in the memory 20. The output unit 30 is, for example, a display device such as a liquid crystal display, a communication device such as a data communication card, or a communication module that conforms to a short-range wireless communication standard such as Bluetooth®. The external interface 40A is an interface for connecting the imaging apparatus 2A, which is a first imaging apparatus, to the moving-object counter apparatus 1. The external interface 40B is an interface for connecting the imaging apparatus 2B, which is a second imaging apparatus, to the moving-object counter apparatus 1.

The imaging apparatuses 2A and 2B are cameras that capture images of a predetermined region. Here, specifically, the predetermined region is a region in front of an entrance of a facility. Here, specifically, the facility is a store.

Figure 2:
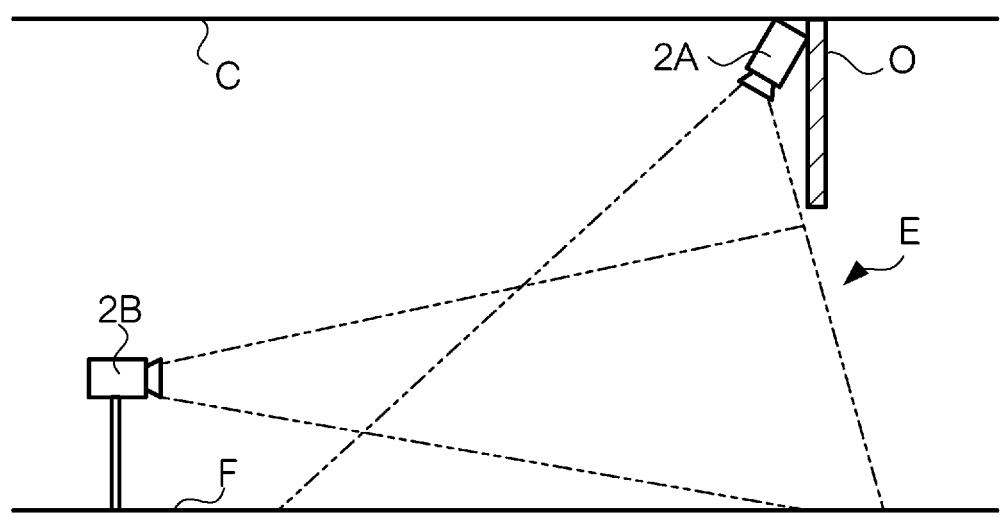
FIG. 2 is a diagram illustrating an example of installation of imaging apparatuses.

FIG. 2 is a diagram illustrating an example of installation of the imaging apparatuses 2A and 2B. The imaging apparatus 2A is installed at a ceiling C inside the store, and captures images of a region in front of an entrance E of the store from above. When being installed at the ceiling C, the imaging apparatus 2A is installed in an inclined manner such that an obstruction O such as a shutter is not included in images. In other words, the imaging apparatus 2A is installed such that the optical axis of the imaging apparatus 2A does not become parallel to the normal to a floor surface F. The imaging apparatus 2A outputs captured moving-image data to the external interface 40A. In contrast, the imaging apparatus 2B is installed inside the store, and captures, in a horizontal direction, images of the region in front of the entrance E of the store. The imaging apparatus 2B outputs captured moving-image data to the external interface 40B.

The controller 10 realizes, by executing the program stored in the memory 20, functions that are a first captured-image acquisition unit 11, a moving-object moving-path specifying unit 12, a virtual-line setting unit 13, a first moving-object counter unit 14, a second captured-image acquisition unit 15, a face-portion direction specifying unit 16, and a second moving-object counter unit 17.

The first captured-image acquisition unit 11 acquires multiple images captured at respective times different from each other by the imaging apparatus 2A. Here, specifically, the multiple images are multiple still images that have been captured continuously. Note that the multiple images do not have to be continuous still images, and may also be discontinuous still images.

The moving-object moving-path specifying unit 12 specifies, on the basis of the multiple images acquired by the first captured-image acquisition unit 11, one or more moving paths along which one or more respective persons have moved in the region in front of the entrance E of the store. Specifically, first, the moving-object moving-path specifying unit 12 detects, in each of the multiple images acquired by the first captured-image acquisition unit 11, a moving-object region using a background subtraction method, the moving-object region being a region in which a moving object is positioned. Next, the moving-object moving-path specifying unit 12 extracts a Histograms-of-Oriented-Gradients (HOG) feature value from each of the detected moving-object regions, and determines, in the detected moving-object regions, person regions in which persons are positioned using a person recognition device constructed through prior learning to recognize persons. Finally, the moving-object moving-path specifying unit 12 specifies, on the basis of each of the moving-object regions determined to be the person regions, the moving paths of the persons using a particle filter.

The virtual-line setting unit 13 sets a virtual line on the basis of the moving paths specified by the moving-object moving-path specifying unit 12, the virtual line being imagined on the images acquired by the first captured-image acquisition unit 11, and serving as a reference for counting of persons who have passed through a predetermined position in the region in front of the entrance of the facility. Here, specifically, the predetermined position is a position directly below the imaging apparatus 2A.

Specifically, the virtual-line setting unit 13 sets, on the basis of moving directions indicated by the moving paths specified by the moving-object moving-path specifying unit 12, an angle of the virtual line that is the angle formed with respect to a reference line preset on the images acquired by the first captured-image acquisition unit 11. Here, specifically, the reference line preset on the images is one side of each image. When the angle of the virtual line is set, the virtual-line setting unit 13 sets the angle of the virtual line such that the virtual line forms a predetermined angle with respect to the moving direction. Here, specifically, the predetermined angle is 90 degrees.

In addition, for each of the multiple images acquired by the first captured-image acquisition unit 11, the virtual-line setting unit 13 sets, on the basis of attribute values of the multiple person regions detected by the moving-object moving-path specifying unit 12, coordinates through which the virtual line passes on the image. Here, specifically, the attribute value of each person region is the area of the person region. In this case, the virtual-line setting unit 13 sets, as the above-described coordinates, coordinates of the person region having the smallest area among the multiple detected person regions. Here, specifically, the coordinates of the person region are the coordinates of the barycenter of the person region.

The first moving-object counter unit 14 counts, by counting moving paths that cross the virtual line set by the virtual-line setting unit 13 among the moving paths specified by the moving-object moving-path specifying unit 12, persons who have passed through the position directly below the imaging apparatus 2A.

The second captured-image acquisition unit 15 acquires an image captured by the imaging apparatus 2B. The second captured-image acquisition unit 15 particularly acquires a captured image of persons who have passed through the position directly below the imaging apparatus 2A.

On the basis of the image acquired by the second captured-image acquisition unit 15, the face-portion direction specifying unit 16 specifies, for each of the persons who have passed through the position directly below the imaging apparatus 2A, the direction in which the face portion of the person is facing. Specifically, the face-portion direction specifying unit 16 determines whether a frontal face of the person or the back of the person's head is detected from the acquired image using a frontal face recognition device constructed through prior learning to recognize frontal faces and a back-of-head recognition device constructed through prior learning to recognize the back of persons' heads. In other words, the face-portion direction specifying unit 16 determines whether the person is facing toward the imaging apparatus 2B or in the direction opposite to the imaging apparatus 2B.

In the case where the direction specified by the face-portion direction specifying unit 16 is a predetermined direction, the second moving-object counter unit 17 counts the person who has passed through the position directly below the imaging apparatus 2A as a person who has entered the store. Here, specifically, the predetermined direction is the direction in which the imaging apparatus 2B is present. In other words, the predetermined direction is a direction toward the inside of the store.

1-2. Operation

Figure 3:
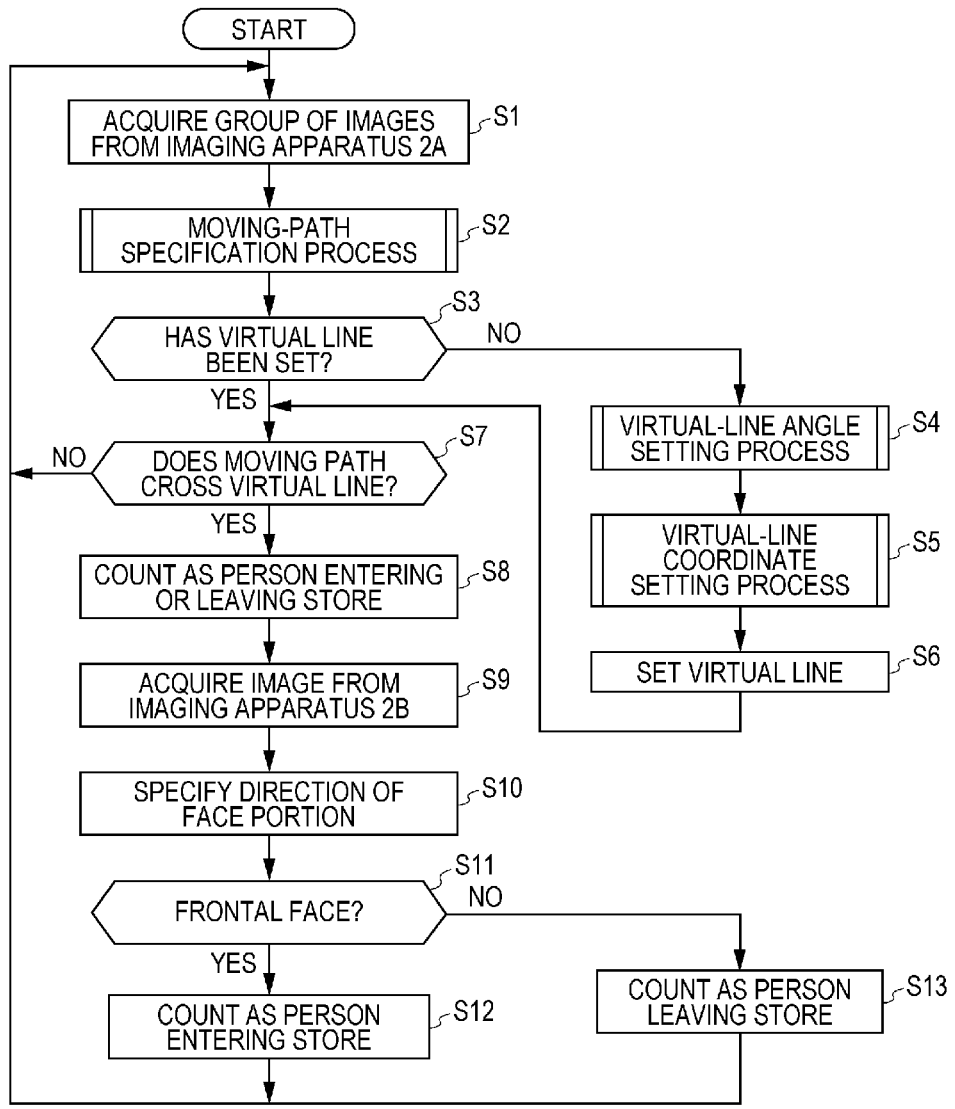
FIG. 3 is a flowchart illustrating an example of a moving-object counting operation.

The operation of the moving-object counter apparatus 1 will be described. FIG. 3 is a flowchart illustrating an example of a moving-object counting operation executed by the moving-object counter apparatus 1. In this moving-object counting operation, persons entering the store and persons leaving the store are counted on the basis of images captured by the imaging apparatuses 2A and 2B.

Figure 4:
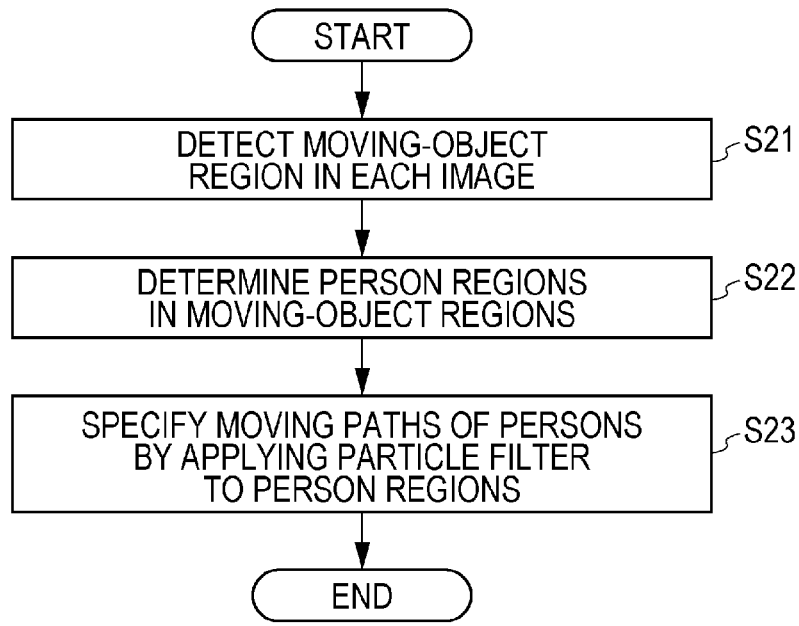
FIG. 4 is a flowchart illustrating an example of a moving-path specification process.

The first captured-image acquisition unit 11 of the moving-object counter apparatus 1 acquires multiple images continuously captured by the imaging apparatus 2A (S1). When the multiple images are acquired, the moving-object moving-path specifying unit 12 executes a moving-path specification process (S2). FIG. 4 is a flowchart illustrating an example of the moving-path specification process.

In the moving-path specification process, the moving-object moving-path specifying unit 12 detects, in each of the multiple images acquired in step S1, a moving-object region that is a region in which a moving object is positioned (S21). When the moving-object regions are detected, the moving-object moving-path specifying unit 12 extracts a HOG feature value from each of the detected moving-object regions, and determines, in the detected moving-object regions, person regions in which persons are positioned using the person recognition device constructed through prior learning to recognize persons (S22). When the person regions are determined, the moving-object moving-path specifying unit 12 specifies the moving paths of persons by applying the particle filter to each of the moving-object regions (more specifically, the barycenter of each of the moving-object regions) determined to be the person regions (S23).

After completion of the moving-path specification process, in the case where a virtual line has not been set (NO in S3), the process proceeds to step S4. In contrast, in the case where the virtual line has been set (YES in S3), the process proceeds to step S7.

Figure 5:
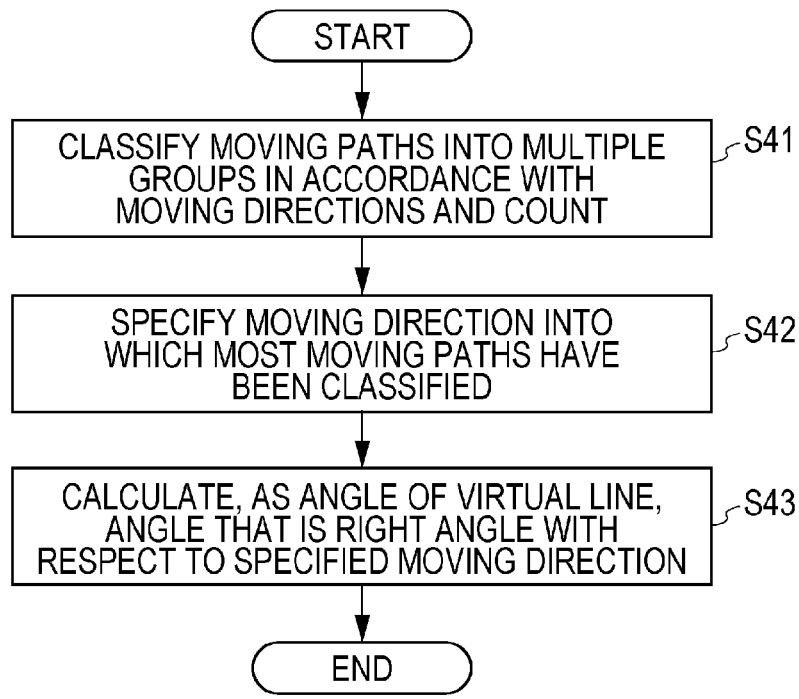
FIG. 5 is a flowchart illustrating an example of a virtual-line angle setting process.

In the case where it is determined in step S3 that the virtual line has not been set, the virtual-line setting unit 13 executes a virtual-line angle setting process (S4). FIG. 5 is a flowchart illustrating an example of the virtual-line angle setting process.

Figure 6:
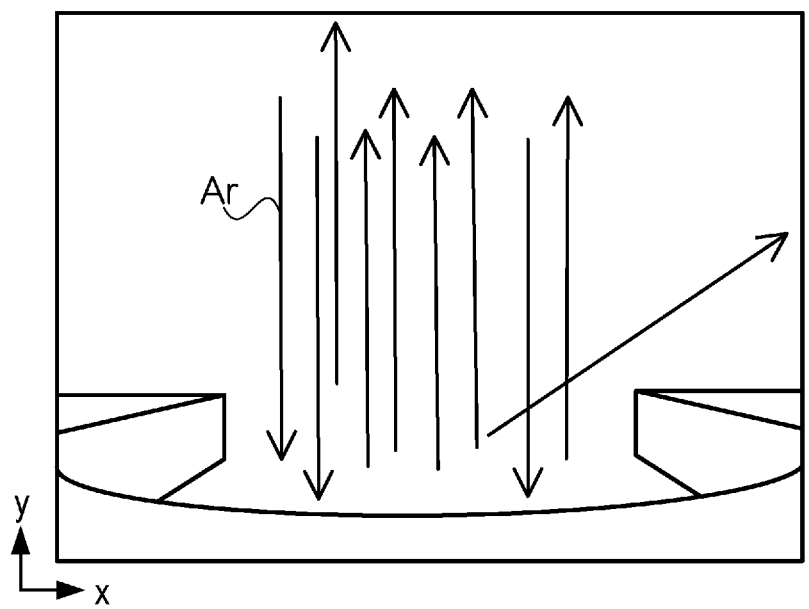
FIG. 6 is a diagram illustrating an example of moving paths.
Figure 7:
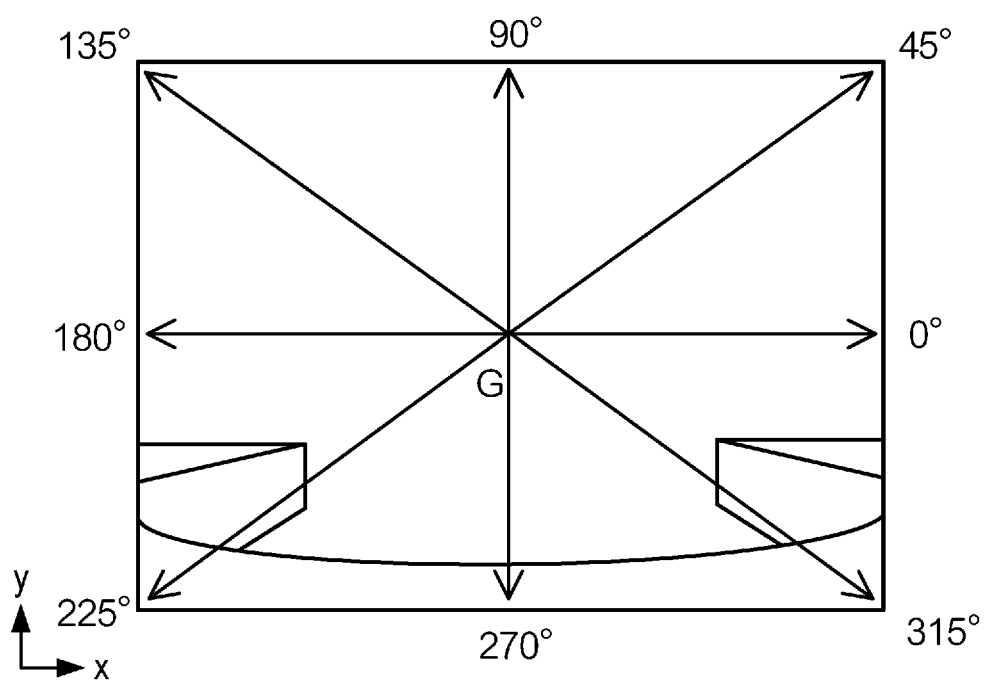
FIG. 7 is a diagram illustrating an example of moving-direction classification.
Figures 8, 9:
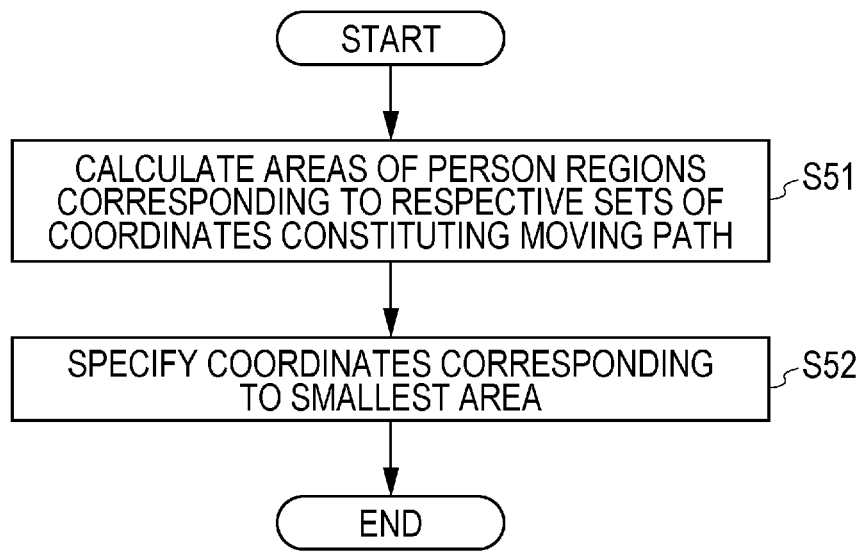
FIG. 8 is a diagram illustrating an example of a moving-path count table.
FIG. 9 is a flowchart illustrating an example of a virtual-line coordinate setting process.

In the virtual-line angle setting process, the virtual-line setting unit 13 classifies the moving paths specified in step S2 into multiple groups in accordance with the moving directions, and counts the moving paths on a group-by-group basis (S41). FIG. 6 is a diagram illustrating an example of each of the moving paths specified in step S2. An arrow Ar illustrated in FIG. 6 indicates the moving path of a person. FIG. 6 illustrates the moving paths of 10 persons. Each moving path is expressed using the xy coordinate system in which the lower-left corner of the image is treated as the origin. FIG. 7 is a diagram illustrating an example of moving-direction classification to which reference is made when moving paths are classified. In the classification illustrated in FIG. 7, moving directions are classified into eight directions from 0 degrees to 315 degrees in units of 45 degrees. The 0-degree moving direction starts from a barycenter G of the image, and is a direction parallel to the x axis. Note that in the case where the moving direction that matches a certain moving path is not any of the eight directions illustrated in FIG. 7, the virtual-line setting unit 13 classifies the moving path into the moving direction closest to the moving path. In addition, in the case where a certain moving path is not straight (that is, in the case where the moving path is constituted by multiple vectors), a resultant vector is calculated, and the calculated resultant vector is classified into any one of the moving directions. FIG. 8 is a diagram illustrating an example of a count table generated in the case where the moving paths illustrated in FIG. 6 are classified into the eight directions illustrated in FIG. 7. According to the count table illustrated in FIG. 8, it is clear that the most moving paths correspond to the 90-degree moving direction. After classifying and counting the moving paths, the virtual-line setting unit 13 specifies the moving direction into which the most moving paths have been classified (S42). According to the example illustrated in FIG. 8, the moving direction "90 degrees" is specified. After specifying the moving direction, the virtual-line setting unit 13 calculates, as the angle of the virtual line (0 degrees≤θ<180 degrees), the angle that is a right angle with respect to the specified moving direction (S43). If 90 degrees are determined to be the moving direction, the virtual-line setting unit 13 calculates 0 degrees as the angle of the virtual line.

After setting the angle of the virtual line, the virtual-line setting unit 13 executes a virtual-line coordinate setting process (S5). FIG. 9 is a flowchart illustrating an example of the virtual-line coordinate setting process.

Figure 10:
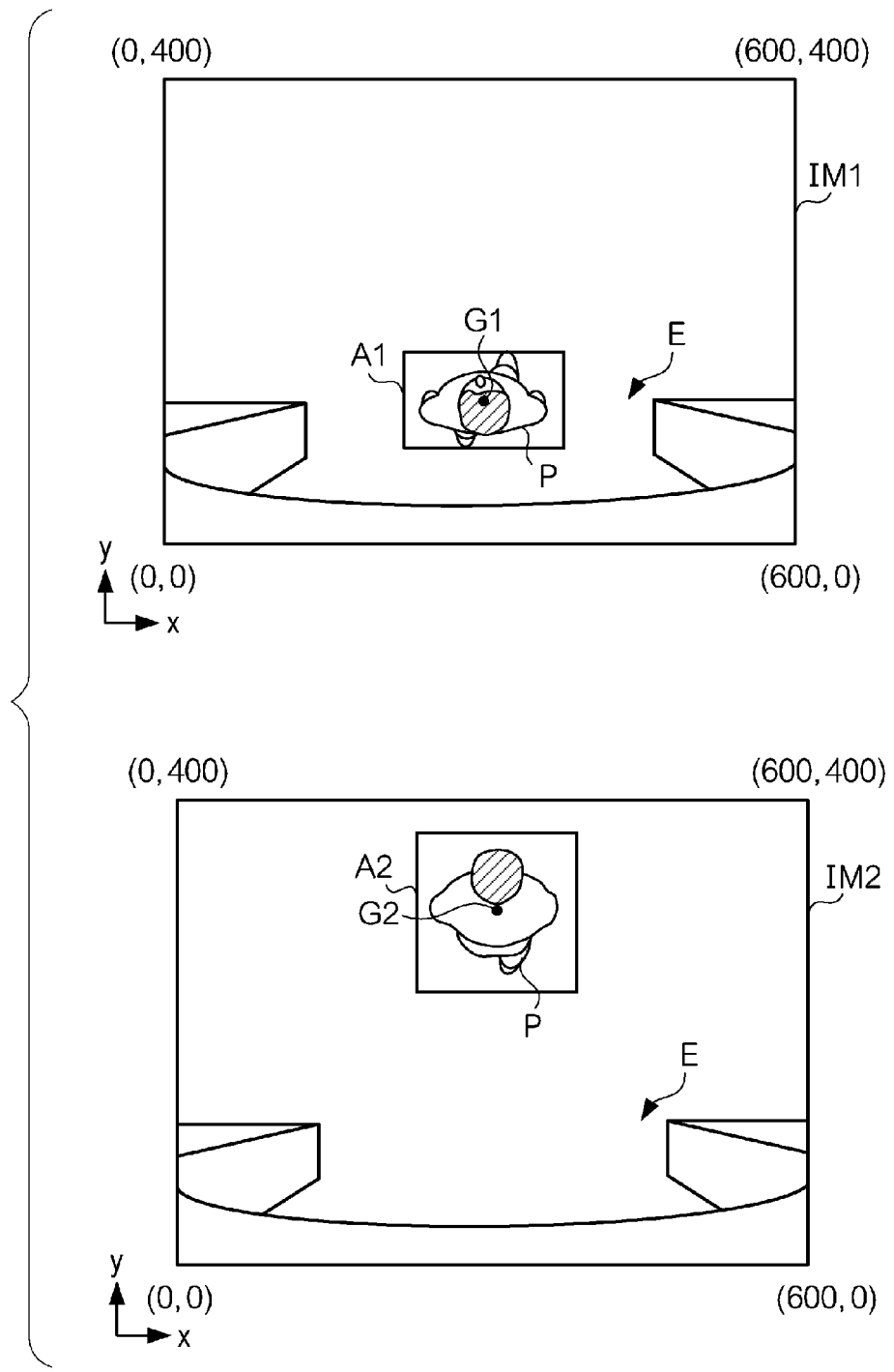
FIG. 10 is a diagram illustrating an example of changes in person regions corresponding to sets of coordinates of a moving path.

In the virtual-line coordinate setting process, about one moving path classified into the moving direction specified in step S42, the virtual-line setting unit 13 calculates the areas of person regions corresponding to respective sets of coordinates constituting the moving path (S51). FIG. 10 is a diagram illustrating an example of changes in the person regions corresponding to the sets of coordinates of the moving path. An image IM1 illustrated in FIG. 10 is an image captured by the imaging apparatus 2A at the time of t seconds. In contrast, an image IM2 is an image captured by the imaging apparatus 2A at the time of t+1 seconds. Person regions A1 and A2 illustrated in the respective images are expressed using circumscribed rectangles with which image portions representing a person P are enclosed. The person regions A1 and A2 are expressed using the xy coordinate system in which the lower-left corner of the image is treated as the origin. A barycenter G1 of the person region A1 and a barycenter G2 of the person region A2 are positioned at respective sets of coordinates constituting the moving path. FIG. 11 is a diagram illustrating an example of the areas of the person regions corresponding to the sets of coordinates constituting the moving path. According to FIG. 11, until 1.50 seconds have passed after the person P passes through the entrance E, as a y-coordinate value increases, that is, as the person P goes away from the entrance E, the area decreases. After 1.50 seconds have passed after the person P passes through the entrance E, as the y-coordinate value increases, that is, as the person P goes away from the entrance E, the area increases. After calculating the area of each person region, the virtual-line setting unit 13 specifies coordinates corresponding to the smallest area among the calculated areas (S52). According to the example illustrated in FIG. 11, coordinates "(200, 150)" corresponding to an area "100" are specified. Here, the coordinates corresponding to the smallest area are coordinates corresponding to the position directly below the imaging apparatus 2A in the region in front of the entrance E of the store.

Figure 12:
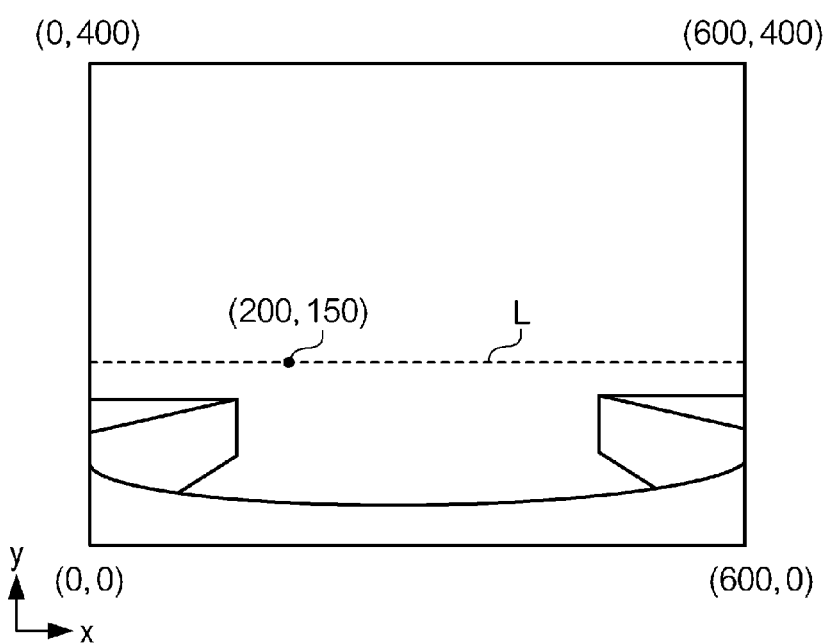
FIG. 12 is a diagram illustrating an example of a virtual line.

After setting coordinates of a virtual line, the virtual-line setting unit 13 sets the virtual line on the basis of the angle set in step S4 and the coordinates set in step S5 (S6). Specifically, a line segment that forms the angle set in step S4 with respect to the x axis of the image, and that passes through the coordinates set in step S5 is set as the virtual line. FIG. 12 is a diagram illustrating an example of the set virtual line. In the example illustrated in FIG. 12, a virtual line L set in the case where an angle "0 degrees" is set in step S4, and coordinates "(200, 150)" are set in step S5 is illustrated. The virtual line L is expressed using the xy coordinate system in which the lower-left corner of the image is treated as the origin.

Figure 13:
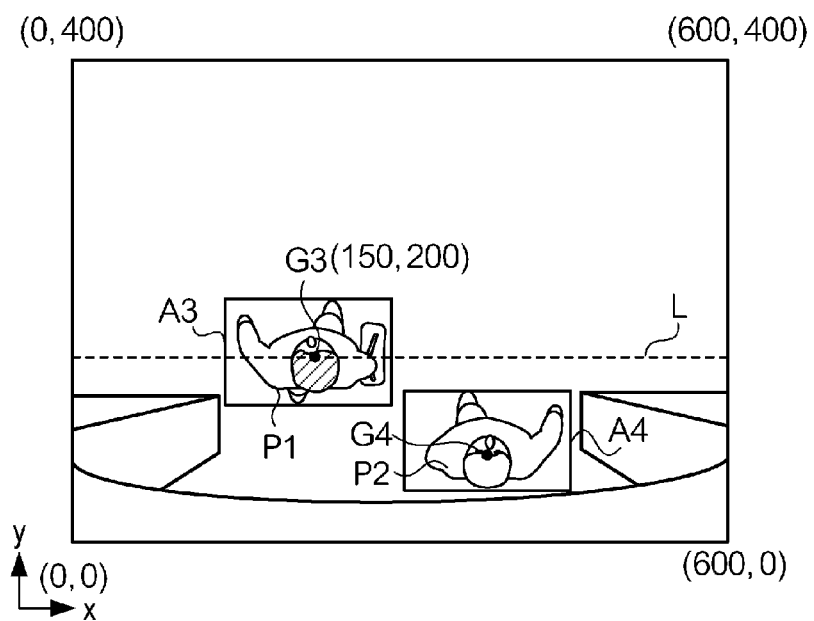
FIG. 13 is a diagram illustrating an example of an image captured by an imaging apparatus among the imaging apparatuses.

After the virtual line is set, the first moving-object counter unit 14 determines whether each of the moving paths specified in step S2 crosses the virtual line set in step S6 (S7). As a result of this determination, in the case where the moving path does not cross the virtual line, that is, where no person has passed directly below the imaging apparatus 2A (NO in S7), the process returns to step S1. In contrast, as a result of this determination, in the case where the moving path crosses the virtual line, that is, where a certain person has passed directly below the imaging apparatus 2A (YES in S7), the first moving-object counter unit 14 counts the person as a person entering or leaving the store (S8). Specifically, the value of the number of persons entering or leaving the store stored in the memory 20 is incremented. FIG. 13 is a diagram illustrating an example of a captured image of a person passing directly below the imaging apparatus 2A. In the image illustrated in FIG. 13, a person region A3 of a person P1 and a person region A4 of a person P2 are detected. A barycenter G3 of the person region A3 among these person regions A3 and A4 crosses the virtual line L at coordinates (150, 200).

Figure 14:
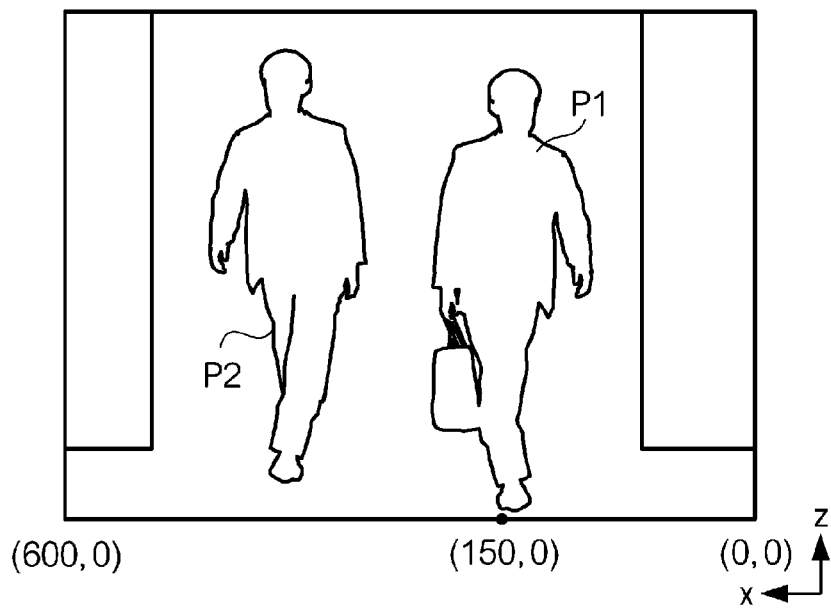
FIG. 14 is a diagram illustrating an example of an image captured by the other imaging apparatus among the imaging apparatuses.

When the person is counted as a person entering or leaving the store, the second captured-image acquisition unit 15 acquires an image of the person captured by the imaging apparatus 2B (S9). Specifically, an image captured by the imaging apparatus 2B at the time when the person passes directly below the imaging apparatus 2A is acquired. Here, the time when the person passes directly below the imaging apparatus 2A is specified by referring to a time stamp of the image in which the barycenter of the person region of the person is positioned on the virtual line. FIG. 14 is a diagram illustrating an example of an image captured by the imaging apparatus 2B at the time when the image illustrated in FIG. 13 is captured. In the image illustrated in FIG. 14, the position of each person is expressed using a rectangular coordinate system composed of the x axis and the z axis. Here the x axis corresponds to the x axis illustrated in FIG. 13. For example, the position of the person P1 is recognized using the x coordinate "150". According to the image illustrated in FIG. 14, the direction in which the face portion of the person P1 is facing and the direction in which the face portion of the person P2 is facing are specified.

When the image of the person entering or leaving the store is acquired, the face-portion direction specifying unit 16 specifies, on the basis of the acquired image, the direction in which the face portion of the person is facing (S10). Specifically, the face-portion direction specifying unit 16 determines whether a frontal face of the person or the back of the person's head is detected from the acquired images using the frontal face recognition device constructed through prior learning to recognize frontal faces and the back-of-head recognition device constructed through prior learning to recognize the back of persons' heads. In other words, the face-portion direction specifying unit 16 determines whether the person is facing toward the imaging apparatus 2B or in the direction opposite to the imaging apparatus 2B. As a result of this determination, in the case where the frontal face of the person is detected (YES in S11), the second moving-object counter unit 17 counts the person as a person entering the store (S12). Specifically, the value of the number of persons entering the store stored in the memory 20 is incremented. In contrast, as a result of this determination, in the case where the back of the person's head is detected (NO in S11), the second moving-object counter unit 17 counts the person as a person leaving the store (S13). Specifically, the value of the number of persons leaving the store stored in the memory 20 is incremented.

The description above is about the moving-object counting operation.

2. Modification

The above-described exemplary embodiment may be modified as in the following. In addition, the following modifications may each be combined with one or more other modifications.

2-1. First Modification

The persons according to the above-described exemplary embodiment are an example of moving objects. The moving objects may also be animals other than persons. Alternatively, the moving objects may also be objects that are moved through persons' operation (for example, cars).

2-2. Second Modification

The region in front of the entrance E of the store according to the above-described exemplary embodiment is an example of a predetermined region whose images are captured by the imaging apparatus 2A. This predetermined region may be another region inside the store (for example, a corridor), or may also be a region outside the store. In addition, the store according to the above-described exemplary embodiment is an example of a facility for which the number of persons entering or leaving the facility is counted. The facility for which the number of persons entering or leaving the facility is to be counted may also be, for example, a house or an office other than the store.

2-3. Third Modification

The moving-object moving-path specifying unit 12 according to the above-described exemplary embodiment may specify, using a known technique different from the above-described technique, a moving path from the multiple images acquired by the first captured-image acquisition unit 11. For example, the moving-object moving-path specifying unit 12 may extract, from each of the moving-object regions detected from the images, another feature value (for example, an Edge of Orientation Histograms (EOH) feature value or an Edgelet feature value) other than the HOG feature value, and determine a person region using the person recognition device. In addition, the moving-object moving-path specifying unit 12 may also determine the moving path of a person by applying another moving-object tracking technique (for example, mean shift) other than the particle filter to the person region.

2-4. Fourth Modification

In the virtual-line angle setting process according to the above-described exemplary embodiment, the angle of the virtual line is set on the basis of the moving paths of the 10 persons (see FIG. 6); however, the number of moving paths to which reference is made to set the angle of the virtual line may be less than 10 or greater than or equal to 11. In addition, in the virtual-line angle setting process, the moving paths of the 10 persons are classified into the eight directions (see FIG. 7); however, the number of directions into which the moving paths are classified may be less than eight or greater than or equal to nine. In addition, in the virtual-line angle setting process, the angle that is a right angle with respect to the moving direction into which the most moving paths are classified is calculated as the angle of the virtual line; however, the angle of the virtual line does not have to be strictly a right angle with respect to the moving direction. That is, preferably, the angle of the virtual line is a substantially right angle with respect to the moving direction. In addition, in the virtual-line angle setting process, the angle formed by the virtual line and one side of the image (specifically, the x axis) is set as the angle of the virtual line; however, the one side of this image is an example of the reference line preset in the image. The reference line preset in this image may also be a line segment (for example, a diagonal line of the image).

2-5. Fifth Modification

In the virtual-line coordinate setting process according to the above-described exemplary embodiment, the person region detected in the image is expressed using a circumscribed rectangle; however, the circumscribed rectangle is an example of the shape of the person region. The shape of the person region may also be another shape (for example, a circumcircle) other than the circumscribed rectangle. In addition, in the virtual-line coordinate setting process, the coordinates of the barycenter of the person region having the smallest area are set as coordinates of the virtual line; however, the coordinates of the barycenter of the person region are an example of coordinates indicating the person region. The coordinates indicating the person region may also be coordinates of a point (for example, a vertex of the person region) other than the barycenter. In addition, in the virtual-line coordinate setting process, the coordinates of the person region having the smallest area are set as coordinates of the virtual line; however, the coordinates of the person region having the smallest amount of change in area may also be set as coordinates of the virtual line. Here, the person region having the smallest amount of change in area is a person region having an area obtained before or after the amount of change becomes smallest. In addition, in the virtual-line coordinate setting process, the coordinates of the person region having the smallest area are set as coordinates of the virtual line; however, the area of the person region is an example of the attribute value to which reference is made to set coordinates of the virtual line. The attribute value to which reference is made to set coordinates of the virtual line may also be an attribute value (for example, the width, the height, or the length of a diagonal line of the person region) other than the area of the person region.

2-6. Sixth Modification

In the virtual-line coordinate setting process according to the above-described exemplary embodiment, the areas of the person regions corresponding to the sets of coordinates constituting the moving path are calculated, and the coordinates of the person region having the smallest area are set as coordinates of the virtual line. However, this method is an example of a method for setting coordinates of the virtual line. As another method, the virtual-line setting unit 13 may set coordinates of the virtual line on the basis of a relative positional relationship between a person region detected in each of multiple images by the moving-object moving-path specifying unit 12 and a head-portion region in which a head portion of the person is positioned. More specifically, among pairs of the person regions and the head-portion regions detected in the multiple respective images, the coordinates of the person region or head-portion region of the pair for which the distance between a center portion of the person region and a center portion of the head-portion region is shortest may also be set as coordinates of the virtual line. Here, the case where the distance between the center portion of the person region and the center portion of the head-portion region is shortest is, for example, the case where the center portion of the person region overlaps with the center portion of the head-portion region. Here, specifically, the center portion is the barycenter of each of the regions. Note that in the case where this virtual-line coordinate setting method is employed, the moving-object moving-path specifying unit 12 detects a head-portion region in addition to a person region in each of the multiple images acquired by the first captured-image acquisition unit 11.

Figure 15:
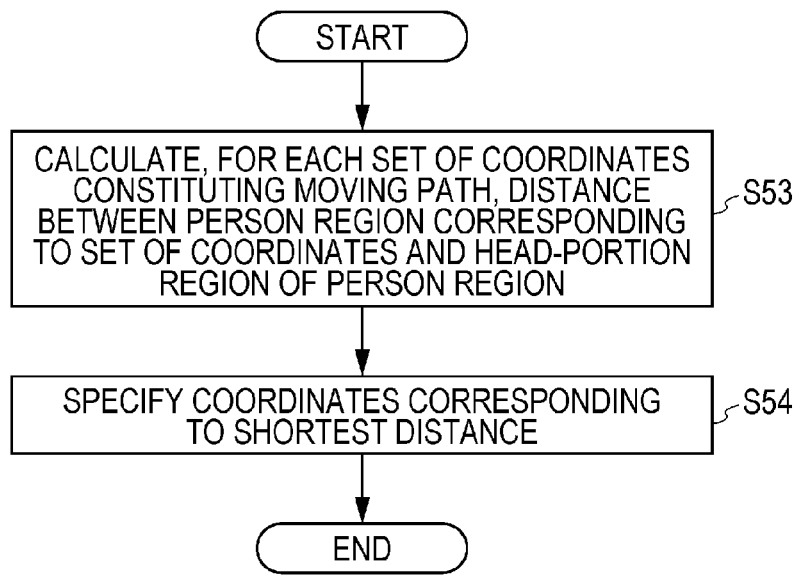
FIG. 15 is a flowchart illustrating an example of a virtual-line coordinate setting process.
Figure 16:
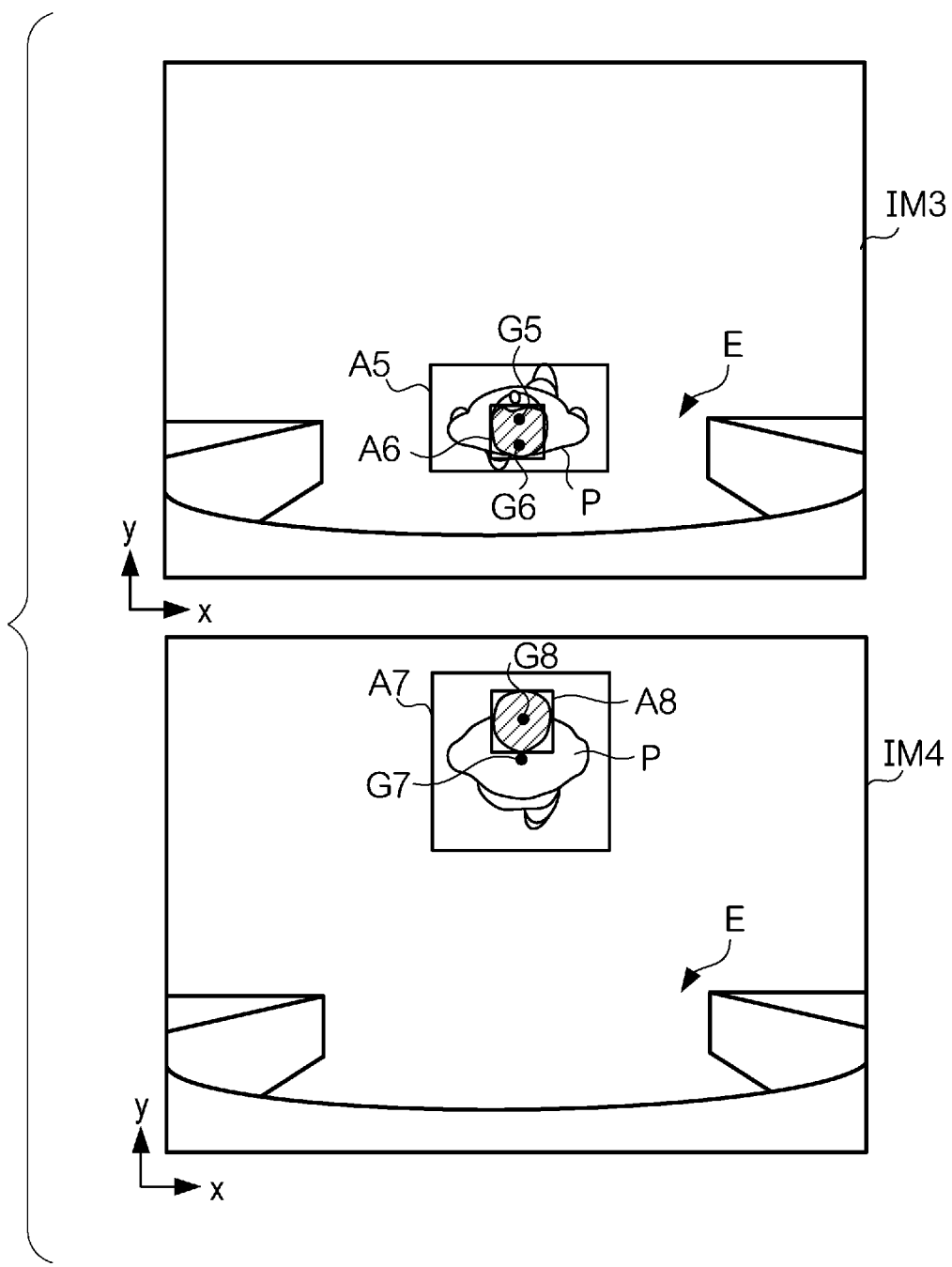
FIG. 16 is a diagram illustrating an example of changes in person regions and head-portion regions corresponding to sets of coordinates of a moving path.
Figures 17, 18:
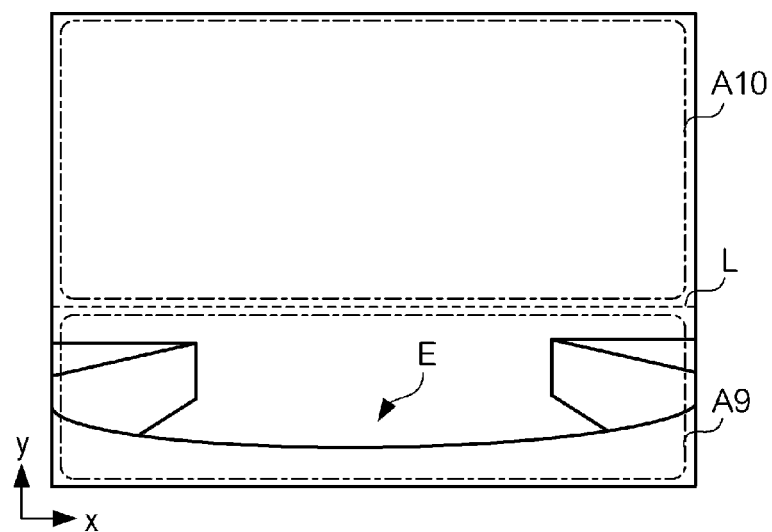
FIG. 17 is a diagram illustrating, for each set of coordinates constituting a moving path, an example of the distance between a person region corresponding to the set of coordinates and a head-portion region of the person region.
FIG. 18 is a diagram illustrating an example of virtual regions.

FIG. 15 is a flowchart illustrating an example of a virtual-line coordinate setting process according to the present modification. In the virtual-line coordinate setting process illustrated in FIG. 15, about one moving path classified into the moving direction specified in step S42, the virtual-line setting unit 13 calculates, for each set of coordinates constituting a moving path, the distance between the person region corresponding to the set of coordinates and the head-portion region of the person region (S53). FIG. 16 is a diagram illustrating an example of changes in person regions and head-portion regions corresponding to the sets of coordinates of the moving path. An image IM3 illustrated in FIG. 16 is an image captured by the imaging apparatus 2A at the time of t seconds. In contrast, an image IM4 is an image captured by the imaging apparatus 2A at the time of t+1 seconds. Person regions A5 and A7 illustrated in the respective images are expressed using circumscribed rectangles with which image portions representing the person P are enclosed. Head-portion regions A6 and A8 illustrated in the respective images are expressed using circumscribed rectangles with which image portions representing the head portion of the person P are enclosed. The person regions A5 and A7 and the head-portion regions A6 and A8 are expressed using the xy coordinate system in which the lower-left corner of the image is treated as the origin. A barycenter G5 of the person region A5 and a barycenter G7 of the person region A7 are positioned at respective sets of coordinates constituting the moving path. FIG. 17 is a diagram illustrating, for each set of coordinates constituting a moving path, an example of the distance between a person region corresponding to the set of coordinates and a head-portion region of the person region. According to FIG. 17, until 1.50 seconds have passed after the person P passes through the entrance E, as a y-coordinate value of the person region increases, that is, as the person P goes away from the entrance E, the distance decreases. After 1.50 seconds have passed after the person P passes through the entrance E, as the y-coordinate value of the person region increases, that is, as the person P goes away from the entrance E, the distance increases. When, for each set of coordinates, calculating the distance between the person region and the head-portion region, the virtual-line setting unit 13 specifies coordinates corresponding to the shortest distance among the calculated distances (S54). According to the example illustrated in FIG. 17, coordinates "(200, 150)" corresponding to a distance "0" are specified. Here, the coordinates corresponding to the shortest distance are coordinates corresponding to the position directly below the imaging apparatus 2A in the region in front of the entrance E of the store.

The description above is about the virtual-line coordinate setting process according to the present modification.

Note that in the virtual-line coordinate setting process described above, the shape of a head-portion region may also be another shape (for example, a circumcircle) other than a circumscribed rectangle. In addition, in the virtual-line coordinate setting process, the coordinates of the person region having the smallest amount of change in distance may also be set as coordinates of the virtual line. Here, the person region having the smallest amount of change in distance is a person region having a distance to a corresponding head-portion region obtained before or after the amount of change becomes smallest. In addition, in the virtual-line coordinate setting process, the coordinates of the head-portion region corresponding to the shortest distance instead of the coordinates of the person region corresponding to the shortest distance may also be set as coordinates of virtual line.

2-7. Seventh Modification

The imaging apparatus 2A according to the above-described exemplary embodiment is installed at the ceiling C of the store such that the imaging apparatus 2A is inclined (see FIG. 2). Thus, in an image captured by the imaging apparatus 2A, the area of a person region detected at the center of the image is not smallest. Thus, in the moving-object counting operation according to the above-described exemplary embodiment, the coordinates of the person region having the smallest area are specified by performing the virtual-line coordinate setting process. However, in the case where the imaging apparatus 2A is installed such that the imaging apparatus 2A is not inclined (in other words, in the case where the imaging apparatus 2A is installed such that the optical axis of the imaging apparatus 2A is parallel to the normal to the floor surface), the area of a person region detected at the center of a captured image is smallest. Thus, in the case where the imaging apparatus 2A is installed such that the imaging apparatus 2A is not inclined, the virtual-line coordinate setting process may be omitted. Instead, coordinates (n, 200) ($0 \leq n \leq 600$) are set in a fixed manner as coordinates of the virtual line.

2-8. Eighth Modification

In the moving-object counting operation according to the above-described exemplary embodiment, after the virtual line is set, two virtual regions are set where the virtual line serves as a boundary, and the first moving-object counter unit 14 may count persons entering or leaving the store by counting moving paths passing through these two virtual regions. FIG. 18 is a diagram illustrating an example of the virtual regions. In the example illustrated in FIG. 18, a virtual region A9 is set on the side closer to the entrance E, and a virtual region A10 is set on the side further from the entrance E. Each virtual region is expressed using the xy coordinate system in which the lower-left corner of the image is treated as the origin.

2-9. Ninth Modification

The program executed by the controller 10 of the moving-object counter apparatus 1 according to the above-described exemplary embodiment may be provided in the state of being stored in a storage medium such as a magnetic tape, a magnetic disk, a flexible disk, an optical disc, a magneto-optical disk, or a memory. In addition, the program may also be downloaded through communication lines such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A moving-object counter apparatus comprising:
    a controller configured to act as:
        a first captured-image acquisition unit that acquires a plurality of images captured at respective times different from each other by a first imaging apparatus capturing images of a predetermined region;
        a moving-object moving-path specifying unit that specifies, on the basis of the plurality of images acquired by the first captured-image acquisition unit, one or more moving paths along which one or more respective moving objects have moved in the predetermined region;
        a virtual-line setting unit that sets a virtual line on the basis of the one or more moving paths specified by the moving-object moving-path specifying unit, the virtual line being imagined on the images acquired by the first captured-image acquisition unit, and serving as a reference for counting of one or more moving objects that have passed through a predetermined position in the predetermined region; and
        a first moving-object counter unit that counts, by counting one or more moving paths that cross the set virtual line among the one or more moving paths specified by the moving-object moving-path specifying unit, the one or more moving objects that have passed through the predetermined position,
    wherein
        the moving-object moving-path specifying unit detects, in each of the plurality of images acquired by the first captured-image acquisition unit, a moving-object region that is a region in which a moving object is positioned among the one or more moving objects, and
        the virtual-line setting unit sets, on the basis of attribute values of the plurality of detected moving-object regions, coordinates through which the virtual line passes on the images, wherein the coordinates through which the virtual line passes on the images are coordinates of a moving-object region having the smallest attribute value or the smallest amount of change in the attribute value among the plurality of detected moving-object regions.

2. The moving-object counter apparatus according to claim 1, wherein the virtual-line setting unit sets, on the basis of a moving direction indicated by the one or more moving paths specified by the moving-object moving-path specifying unit, an angle of the virtual line that is an angle formed with respect to a reference line preset on the images acquired by the first captured-image acquisition unit.

3. The moving-object counter apparatus according to claim 2, wherein the virtual-line setting unit sets the angle of the virtual line such that the virtual line forms a predetermined angle with respect to the moving direction.

4. The moving-object counter apparatus according to claim 3,
    wherein the predetermined region is a region in front of an entrance of a facility, and the controller is further configured to act as:
    a second captured-image acquisition unit that acquires an image captured by a second imaging apparatus and representing a moving object that has passed through the predetermined position among the one or more moving objects, the second imaging apparatus being arranged at a position different from the position at which the first imaging apparatus is arranged;
    a face-portion direction specifying unit that specifies, on the basis of the image acquired by the second captured-image acquisition unit, a direction in which a face portion of the moving object is facing; and
    a second moving-object counter unit that counts, in a case where the direction in which the face portion is facing which is specified by the face-portion direction specifying unit is a predetermined direction, the moving object as a moving object that has entered the facility.

5. The moving-object counter apparatus according to claim 2,
wherein the predetermined region is a region in front of an entrance of a facility, and the controller is further configured to act as:
a second captured-image acquisition unit that acquires an image captured by a second imaging apparatus and representing a moving object that has passed through the predetermined position among the one or more moving objects, the second imaging apparatus being arranged at a position different from the position at which the first imaging apparatus is arranged;
a face-portion direction specifying unit that specifies, on the basis of the image acquired by the second captured-image acquisition unit, a direction in which a face portion of the moving object is facing; and
a second moving-object counter unit that counts, in a case where the direction in which the face portion is facing which is specified by the face-portion direction specifying unit is a predetermined direction, the moving object as a moving object that has entered the facility.

6. The moving-object counter apparatus according to claim 1,
wherein the predetermined region is a region in front of an entrance of a facility, and the controller is further configured to act as:
a second captured-image acquisition unit that acquires an image captured by a second imaging apparatus and representing a moving object that has passed through the predetermined position among the one or more moving objects, the second imaging apparatus being arranged at a position different from the position at which the first imaging apparatus is arranged;
a face-portion direction specifying unit that specifies, on the basis of the image acquired by the second captured-image acquisition unit, a direction in which a face portion of the moving object is facing; and
a second moving-object counter unit that counts, in a case where the direction in which the face portion is facing which is specified by the face-portion direction specifying unit is a predetermined direction, the moving object as a moving object that has entered the facility.

7. A moving-object counter apparatus comprising:
a controller configured to act as:
a first captured-image acquisition unit that acquires a plurality of images captured at respective times different from each other by a first imaging apparatus capturing images of a predetermined region;
a moving-object moving-path specifying unit that specifies, on the basis of the plurality of images acquired by the first captured-image acquisition unit, one or more moving paths along which one or more respective moving objects have moved in the predetermined region;
a virtual-line setting unit that sets a virtual line on the basis of the one or more moving paths specified by the moving-object moving-path specifying unit, the virtual line being imagined on the images acquired by the first captured-image acquisition unit, and serving as a reference for counting of one or more moving objects that have passed through a predetermined position in the predetermined region; and
a first moving-object counter unit that counts, by counting one or more moving paths that cross the set virtual line among the one or more moving paths specified by the moving-object moving-path specifying unit, the one or more moving objects that have passed through the predetermined position,
wherein
the moving-object moving-path specifying unit detects, in each of the plurality of images acquired by the first captured-image acquisition unit, a moving-object region that is a region in which a moving object is positioned among the one or more moving objects, and a head-portion region that is a region in which a head portion of the moving object is positioned, and
the virtual-line setting unit sets, on the basis of relative positional relationships each of which is the relative positional relationship between the moving-object region and the head-portion region detected in a corresponding one of the plurality of images, coordinates through which the virtual line passes on the images, wherein the coordinates through which the virtual line passes on the images are coordinates of a moving-object region or a head-portion region of a pair whose distance from a center portion of the moving-object region to a center portion of the head-portion region is shortest among pairs of the moving-object regions and the head-portion regions detected in the plurality of respective images.

8. A moving-object counting method comprising:
acquiring a plurality of images captured at respective times different from each other;
specifying, on the basis of the plurality of images acquired in the acquiring, one or more moving paths along which one or more respective moving objects have moved in the predetermined region;
setting a virtual line on the basis of the one or more moving paths specified in the specifying, the virtual line being imagined on the images acquired in the acquiring, and serving as a reference for counting of one or more moving objects that have passed through a predetermined position in the predetermined region; and
counting, by counting one or more moving paths that cross the set virtual line among the one or more moving paths specified in the specifying, the one or more moving objects that have passed through the predetermined position,
wherein the method further comprises
detecting, in each of the plurality of images acquired by the first captured-image acquisition unit, a moving-object region that is a region in which a moving object is positioned among the one or more moving objects, and
setting, on the basis of attribute values of the plurality of detected moving-object regions, coordinates through which the virtual line passes on the images, wherein the coordinates through which the virtual line passes on the images are coordinates of a moving-object region having the smallest attribute value or the smallest amount of change in the attribute value among the plurality of detected moving-object regions.

9. A non-transitory computer readable medium storing a program causing a computer to execute a process, the process comprising:
acquiring a plurality of images captured at respective times different from each other;
specifying, on the basis of the plurality of images acquired in the acquiring, one or more moving paths along which one or more respective moving objects have moved in the predetermined region;

setting a virtual line on the basis of the one or more moving paths specified in the specifying, the virtual line being imagined on the images acquired in the acquiring, and serving as a reference for counting of one or more moving objects that have passed through a predetermined position in the predetermined region; and counting, by counting one or more moving paths that cross the set virtual line among the one or more moving paths specified in the specifying, the one or more moving objects that have passed through the predetermined position, wherein the process further comprises detecting, in each of the plurality of images acquired by the first captured-image acquisition unit, a moving-object region that is a region in which a moving object is positioned among the one or more moving objects, and setting, on the basis of attribute values of the plurality of detected moving-object regions, coordinates through which the virtual line passes on the images, wherein the coordinates through which the virtual line passes on the images are coordinates of a moving-object region having the smallest attribute value or the smallest amount of change in the attribute value among the plurality of detected moving-object regions.

* * * * *